Feb. 12, 1957  J. McEWAN ET AL  2,780,945
SAW SHARPENER
Filed March 22, 1954  2 Sheets-Sheet 1
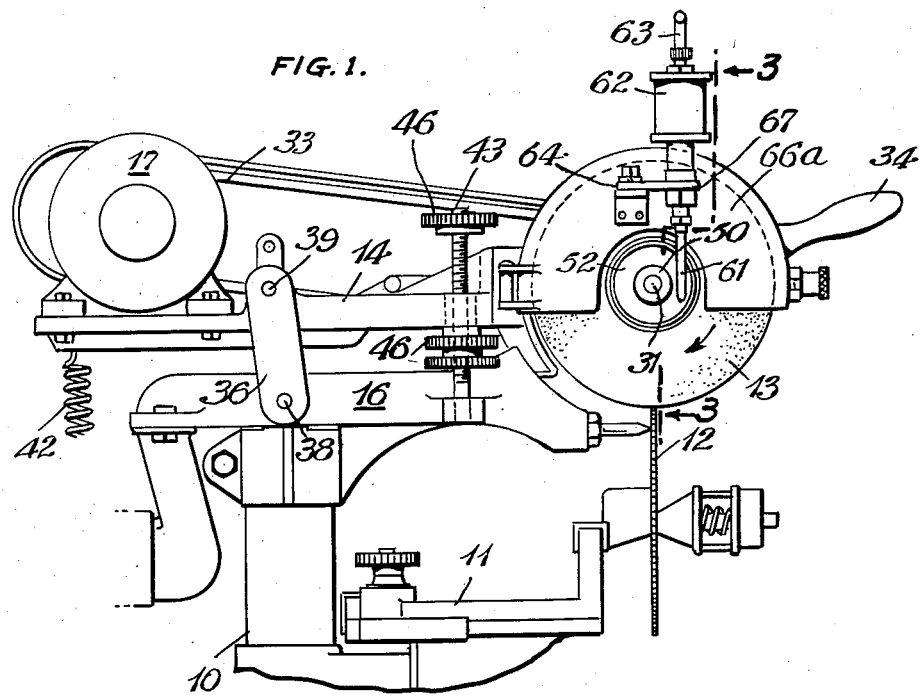
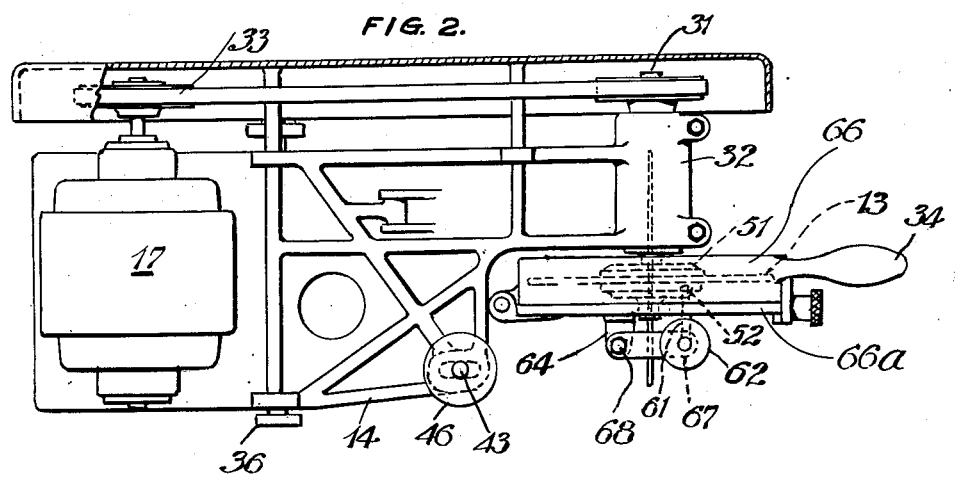
INVENTOR
JAMES MCEWAN
JOHN A. WILHELM
BY Harper Allen
ATTORNEY

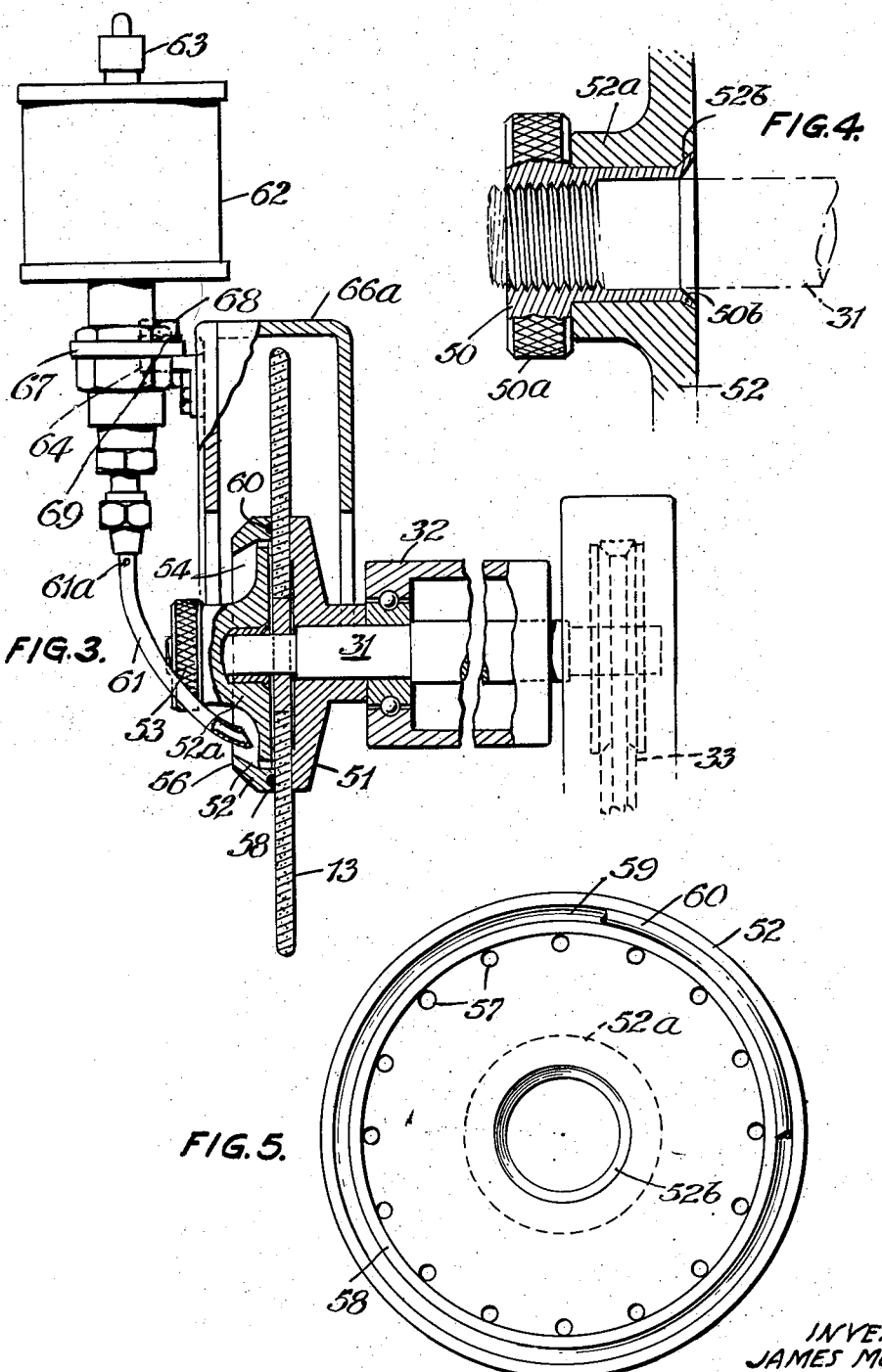

United States Patent Office 2,780,945
Patented Feb. 12, 1957

2,780,945

SAW SHARPENER

James McEwan and John Alfred Wilhelm, San Jose, Calif.; said Wilhelm assignor to said McEwan Application March 22, 1954, Serial No. 417,592

3 Claims. (Cl. 76—40)

The present invention relates to saw sharpeners and is concerned more particularly with the provision of an improved saw sharpener or grinder in which a quick attachable and detachable clamping collar for the grinding wheel is provided which incorporates structure for maintaining the grinding wheel cool during operation.

It is a general object of the invention to provide a saw sharpener of improved construction having means for feeding coolant to the grinding wheel including a quick detachable clamping collar.

Another object of the invention is to provide a coolant device for the grinding wheel of a saw sharpener which can be used with grinding wheels of different widths and which does not interfere with access to the grinding wheel for replacement.

Other objects and advantages of the invention will be apparent from the following description of a preferred embodiment thereof, as illustrated in the accompanying drawings, in which:

Figure 1 is a fragmentary side elevational view of a saw sharpener embodying the invention.

Figure 2 is a fragmentary plan view of a saw sharpener with certain parts broken away for clear illustration.

Figure 3 is a sectional elevational view through the axis of the grinding wheel taken in a plane indicated by the line 3—3 in Figure 1.

Figure 4 is an enlarged view of the clamping collar or nut construction.

Figure 5 is an elevational view of the inside face or clamping face of the collar.

In general the saw sharpener is of the type disclosed in Patent 2,590,992, issued April 1, 1952, for Saw Sharpener. The saw sharpener includes a base portion or post 10 on which a saw support 11 is mounted for supporting a saw 12 in relation to a saw sharpening device or grinding wheel 13. The wheel 13 is carried by a mounting bracket or support element which is carried on a dust chute 16 forming a part of the base portion 10. The saw support bracket 14 has a floating pivotal mounting providing for up and down movement of the wheel 13 with respect to the saw 12 under control of the operator utilizing the handle 34. This mounting includes a main support link 36 pivotally connected at 38 on the dust chute 16 and also at 39 to the bracket 14. A spring 42 connected between the bracket 14 and a portion of the support 10 provides a counter-balancing of the bracket 14. To provide for limited in and out movement of the wheel 13 with respect to the saw 12, the dust chute 16 carries an upstanding stud 43 which passes through an apertured portion of the bracket 14 and is supported on the dust chute 16 having respective stop nuts 46 provided thereon to limit movement of the saw support bracket 14. The grinding wheel 13 has its support shaft 31 journalled in a boss 32 of the bracket 14 and the shaft 31 is driven through a suitable pulley and belt arrangement 33 from the motor 17.

The grinding wheel 13 is detachably secured on the shaft 31 by means of an inner clamping collar or support element 51 of conventional construction which may be press fitted on the shaft 31 and an outer clamping collar 52 secured in place by a nut 50. The clamping collar 52 is of the quick detachable type and is constructed to form part of a liquid feed system for wetting the grinding wheel 13. The collar 52 includes a hub 52a having a tapered shoulder 52b at one end, and in this hub 52a is journalled a nut member 50 having a knurled head 50a overlapping one end of the hub 52a and a turned or formed flange 50b at the opposite end overlapping the inclined shoulder 52b of the collar 52. To provide for feeding of liquid to the grinding wheel clamped thereby this collar 52 includes an annular recess 54 provided on the outer face of the collar 52 by an annular lip 56. This annular recess 54 forms an annular liquid chamber which is connected by a plurality of apertures 57 with the inner or grinding wheel clamping face 58 of the collar 52. In order to seal the space between the collar 52 and the grinding wheel, the collar 52 is provided with an annular groove 59 in which a resilient O ring 60 of rubber or other suitable material is secured to engage against the adjacent face of the grinding wheel.

In order to supply a liquid to the annular chamber 54, a tube 61 (Figures 1, 2 and 5) of bendable metal has its outlet end positioned closely adjacent the wall 55 to discharge into the recess 54 and extends therefrom to a reservoir or cup 62 of a conventional drip-type feed. The tube 61 is appropriately positioned at the lower end so as to pass freely between the nut 50 and the outer flange or lip 56 of the collar 52 so that it can be freely withdrawn from cooperative relation with the quick detachable coolant collar upon opening of the cover plate 66a. The tube 61 has a vent hole 61a to insure free flow and draining of coolant from the tube.

The cup 62 is mounted for adjustable swinging movement with respect to the cover plate 66a for the guard 66 of the grinding wheel, and for this purpose is carried by an arm or strip 67 which is pivoted by a bolt 68 to an angle bracket 64 carried by the cover plate 66a. A suitable spring friction washer 69 is provided to provide a secure mounting of the cup 62 in any angularly adjusted position thereof.

The valve 63 is adjusted to provide a drip feed of the desired amount of a suitable liquid, such as water for example, into the annular recess 54. Due to rotation of the grinding wheel 13 and the collar 52 therewith, the liquid is urged by centrifugal action through the apertures 57 and then to and against the grinding wheel 13. The construction of the quick detachable collar 52 is such that the coolant can be fed to this collar without interference with the clamping nut 50 of the collar in any laterally adjusted position thereof due to different thicknesses of the grinding wheels employed. In addition, the mounting of the reservoir provides for easy adjustment to the desired width of grinding wheels and for opening and closing of the cover plate of the guard in the event a change in grinding wheels is to be made.

While we have shown a preferred form of the invention, it is capable of variations and modifications from the form shown, so that its scope should be limited only by the scope of the claims appended hereto.

We claim:

1. In a saw sharpener, a support structure, a saw holder on the support structure, a grinding wheel for engaging the teeth of a saw on said saw holder, mounting means for said grinding wheel including means mounted for movement on the support structure to cause engagement of the grinding wheel with the saw, drive means for the grinding wheel including a support shaft having a threaded end, means for securing the grinding wheel on the support shaft including a collar having a clamping portion and a threaded nut carried by the clamping portion for threaded engagement with the support shaft and journalled with respect to the clamping portion so as to be freely rotatable with respect thereto, said collar having an annular recess about the periphery thereof spaced about said clamping nut and passage means for feeding liquid from the recess to a surface of the grinding wheel, and liquid feed means including a reservoir on said mounting means and a tube leading from said reservoir to said annular recess.

2. In a saw sharpener, a support structure, a saw holder on the support structure, a grinding wheel for engaging the teeth of a saw on said saw holder, mounting means for said grinding wheel including means mounted for movement on the support structure to cause engagement of the grinding wheel with the saw, said mounting means including a hinged cover plate for the grinding wheel, drive means for the grinding wheel including a threaded support shaft, means for securing the grinding wheel on the support shaft including a clamping collar having a threaded connection with said shaft and an annular peripheral recess having passage means leading to the surface of the grinding wheel, and liquid feed means including a reservoir mounted for lateral adjustment on said cover plate and a tube leading therefrom to said annular recess.

3. In a saw sharpener, a support structure, a saw holder on the support structure, a grinding wheel for engaging the teeth of a saw on said saw holder, mounting means for said grinding wheel including means mounted for movement on the support structure to cause engagement of the grinding wheel with the saw, said mounting means including a hinged cover plate for the grinding wheel, drive means for the grinding wheel including a threaded support shaft, means for securing the grinding wheel on the support shaft including a clamping collar having a threaded connection with said shaft and an annular peripheral recess having passage means leading to the surface of the grinding wheel, and liquid feed means including a reservoir, a supporting arm pivotally connected to said reservoir and said cover, and a tube connected to said reservoir and extending into said clamping collar to said annular recess.

References Cited in the file of this patent

UNITED STATES PATENTS

| | | |
|---|---|---|
| 500,561 | Carpenter | July 4, 1893 |
| 2,380,332 | Scheer | July 10, 1945 |
| 2,413,016 | Wiken et al. | Dec. 24, 1946 |
| 2,470,350 | Harrington | May 17, 1949 |
| 2,590,992 | McEwan | Apr. 1, 1952 |